United States Patent [19]

Manner

[11] Patent Number: 4,919,987
[45] Date of Patent: Apr. 24, 1990

[54] PROCESS FOR THE JOINING OF POLYAMIDE PARTS BY FRICTION WELDING

[75] Inventor: Walter Manner, Garmisch-Partenkirchen, Fed. Rep. of Germany

[73] Assignee: Verwaltungsgesellschafft Geiger Plastic GmbH & Co. KG, Garmisch-Partenkirchen, Fed. Rep. of Germany

[21] Appl. No.: 143,934

[22] Filed: Jan. 14, 1988

[30] Foreign Application Priority Data

Jan. 15, 1987 [DE] Fed. Rep. of Germany ....... 3700981

[51] Int. Cl.$^5$ .............................................. B29C 65/06
[52] U.S. Cl. ........................................ 428/60; 156/69; 156/73.5; 156/295; 156/304.5; 428/474.7
[58] Field of Search ........................ 156/69, 73.5, 73.1, 156/295, 293, 304.5; 264/23, 68; 228/112, 113; 215/232; 220/67

[56] References Cited

U.S. PATENT DOCUMENTS

| | | | |
|---|---|---|---|
| 3,144,710 | 8/1964 | Hollander et al. | 228/112 |
| 4,566,924 | 1/1986 | Hara et al. | 156/73.5 |
| 4,663,206 | 5/1987 | Bouyoucos et al. | 156/73.5 |
| 4,702,790 | 10/1987 | Hugh et al. | 156/295 |
| 4,746,381 | 5/1988 | Parker et al. | 156/295 |

FOREIGN PATENT DOCUMENTS

| | | | |
|---|---|---|---|
| 3242478 | 5/1984 | Fed. Rep. of Germany | . |
| 58-74315 | 5/1983 | Japan | 156/73.1 |
| 58-219019 | 12/1983 | Japan | 156/73.5 |
| 60-239224 | 11/1985 | Japan | 156/73.1 |
| 61-14935 | 1/1986 | Japan | 156/73.1 |
| 722715 | 3/1980 | U.S.S.R. | 264/23 |

OTHER PUBLICATIONS

Land, W., "Reibschweiben Nach Dem Rotations- und Vibrationsverfahren" (Jan., 1983).
Vibrations-SchweiBgerat Modell 2100 von Branson (W. Germany, 4/1979).

Primary Examiner—Michael Wityshyn
Attorney, Agent, or Firm—Penrose Lucas Albright

[57] ABSTRACT

A process and means for joining polyamide parts by friction welding, whereby the particles, called "turnings" formed and expelled from the welded joint are captured. In the production of many containers composed of relatively hard polyamides, having melting points above 250 degrees Celsius, it is necessary to prevent the turnings from falling into the inside of the container. This is particularly true when the turnings cannot be rinsed or sucked from the interior with relative ease or minimal cost, such as when walls, ribs or chambers are present inside the container. In the past, recesses have been provided near the joint to collect the turnings, however, such recesses did not prevent all turnings from being thrown into the interior of the container. To preclude all turnings from entering the interior of the produced container, the process uses joints having at least one weld surface coated with a cohesive and ductile plastic material and at least one gap formed between facing surfaces which are not welded together. When the surfaces to be joined are forced together, under heat and pressure, the ductile material is forced into the gap. The turnings produced during the friction welding are then absorbed, or captured, by the soft ductile plastic material.

6 Claims, 1 Drawing Sheet

PROCESS FOR THE JOINING OF POLYAMIDE PARTS BY FRICTION WELDING

FIELD OF INVENTION

This invention relates to a process and means for joining synthetic resin parts together by friction welding. In friction welding, one piece is moved rapidly and under pressure against a second held piece. As a result of the friction heat produced, the synthetic resin material is plasticized at the points of contact, that is the point to become the welded joint, and the two pieces are joined upon cooling of the plasticized material portion. If the parts to be joined are rotationally symmetric, or circular, the piece moved is then rotated relative to the stationary piece or the moved piece can be subjected to mechanical oscillations of, for example, 100 cycles per second.

BACKGROUND OF THE INVENTION

When pieces of any relatively hard polyamide, having a defined melting point above about 250 degrees Celsius, are friction welded, small particles, a few hundredths of a millimeter thick and up to several millimeters long that have a chip or hair-like shape (hereafter called "turnings"), are produced at the weld location. The turnings are expelled, or thrown, from the joint weld as solid particles. For containers manufactured from polyamide pieces, a portion of the turnings are depositied inside the container. These turnings can only be removed with difficulty, and at high cost, by methods such as suction or flushing the interior. Further, these cleaning methods may only be used if the container has an open interior, that is, it has no baffles, partition walls, ribs or chambers. If, on the other hand, the inside of the container is not smooth, rather is provided with ribs, baffles, chambers or the like, then the container is, in all likelihood, produced from a number of pieces that must be joined and a large number of turnings will be found within the finished container. The simple, clean interior container can be produced more simply by means of the blow process while the more complex containers require a joining process such as friction welding. If polyamide containers having screens, valves, nozzles, regulators or similar constricted points are used after production, while containing turnings from a friction welded joint, the turnings will migrate to the constricted points thereby reducing the efficiency of, or rendering inoperable, the container. This is readily apparent if the polyamide container is part of a vehicular hydraulic steering or braking system.

It is known to "capture" or "trap" the excess molten material, produced in friction welding, which is dislocated to the side, forming a weld burr, by including recesses in the profile, or design, of the welded joint (for example, "Vibrations-Schweissgeraet Modell 2100 von Branson" prospectus-4/79). Practice, however, shows that this method does not suffice for the joining of polyamide parts since it cannot prevent the turnings being thrown or forced into the inside of the container.

SUMMARY OF THE INVENTION

An object of the invention is to provide a process for making friction welds that precludes the introduction of turnings into the interior of the container or object being assembled.

A further object of the invention is to provide the capability for totally containing, as appropriate, all turnings produced by the friction welding process.

The process is applicable to the creation of friction welds in any relatively hard polyamide, having a defined melting point above about 250 degrees Celsius, wherein turnings are produced. It is particularly applicable to those finished products having relatively complex interiors, that must be particulate free and are difficult and costly to purge of turnings. The process provides turnings traps that capture the turnings as they are created, thereby preventing them from reaching the container's interior. The basic joint is of tongue and groove construction where the groove is wider than the opposing tongue. A capture material is placed between the surfaces to be joined by friction welding and gaps provided between the remaining joint surfaces. When the surfaces to be joined are brought together, under pressure, the capture material is forced from between their surface faces and into the surrounding gaps. As the frictional movement between the surfaces creates turnings, the turnings are absorbed, or captured, by the material filling the surrounding gaps.

Other objects, adaptions and capabilities of the invention will be appreciated and understood by those skilled in the art from the disclosure herein as well as, of course, reductions to practice conforming to such disclosure, reference being had to the accompanying drawings in which:

DESCRIPTION OF THE PREFERRED EMBODIMENTS

Figure 1:
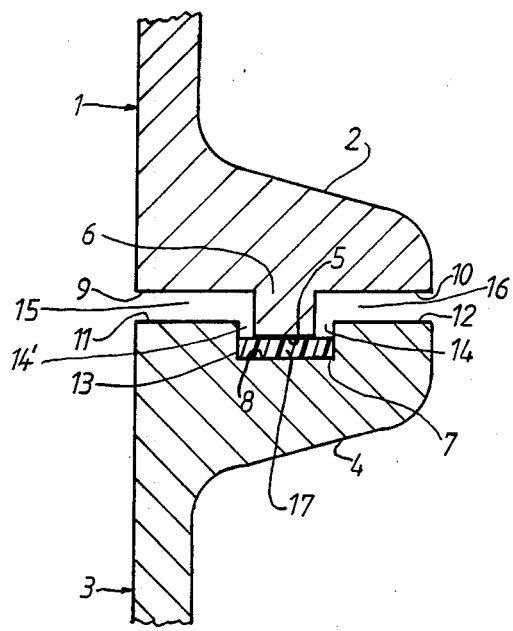
FIG. 1 is a cross-sectional view of the formation of a joint using the process.

In FIG. 1, part 1 has flange 2 for welding to flange 4 of part 3. Part 1 will be moved, to create the heat of friction, during the welding process and part 3 will be held stationary. A projection 6, on the lower side of flange 2, has a weld surface 5, which is melted and plasticized by friction resulting from the pressure and movement within recess 7, in flange 4 of stationary part 3. The recess 7 is wider than projection 6 and its bottom surface 8 is the surface over which weld surface 5 is moved and finally welded.

As shown, when surfaces 5 and 8 are welded together a space remains between opposing surfaces 9 and 11 and surfaces 10 and 12. A plastic or elastic material 17 is introduced into space 13, lying between surfaces 5 and 8, and either or both spaces 14 and 14', between the facing surfaces of projection 6 and recess 7, before parts 1 and 3 are brought together, under pressure, at surfaces 5 and 8. The material 17 is forced from between surfaces 5 and 8, when the pressure is applied, into gaps 14, 14', 15 and 16. As a result, during rotation or vibration of weld surface 8, there is no material 17 remaining between weld surfaces 5 and 8 to interfere with the formation of the weld. However, the material 17, now found in gaps 14 through 16, captures all turnings produced by the friction between surfaces 5 and 8.

Figure 2:
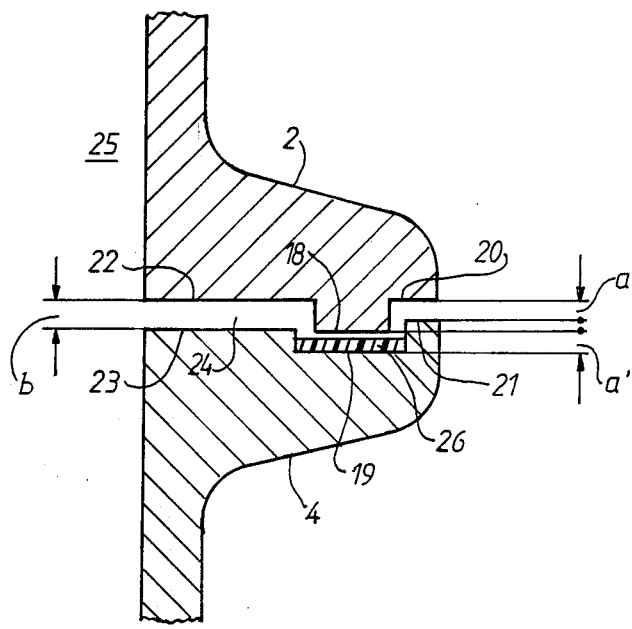
FIG. 2 is a cross-sectional view of a second type joint formed using the process.

The embodiment of FIG. 2 differs from that of FIG. 1 in that the projection, having surface 18, and the recess, having bottom surface 19, which correspond to facing surfaces 5 and 8 of FIG. 1, are not as deep as their counterparts in FIG. 1. Further, surfaces 20 and 21 are also weld surfaces. This is accomplished by raising surface 21 above the level of surface 23, thereby creating identical or nearly identical gaps a and a', while gap b between surface 22 on flange 2 and surface 23 on flange 4 is greater than either a and a'. Thus, when flanges 2 and 4 are brought together under pressure, for the welding process, surfaces 18 to 21 make frictional contact which results in a Z-shaped weld seam. The material 26 that has been placed in the gap between surfaces 18 and 19, for capturing the turnings, is forced into gap 24. In this manner, the turnings are prevented from being ejected into the interior 25 of the container being formed. The ejection of turnings, produced by the welding of surfaces 20 and 21, to the outside of the container is permitted.

Figure 3:
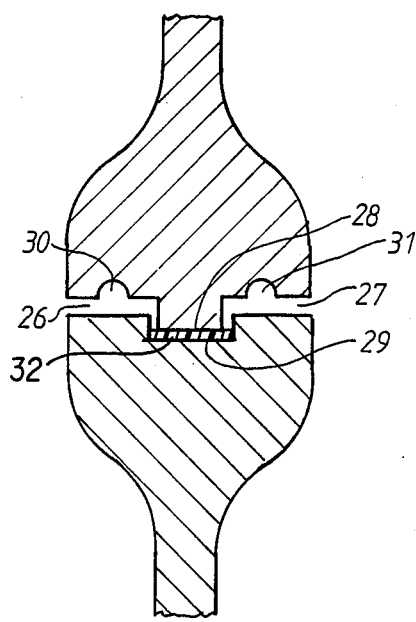
FIG. 3 is a cross-sectional view of a third type joint formed using the process.

The embodiment of FIG. 3 is provided with large grooves 30, 31, in gaps 26 and 27, to catch and contain the plastic or elastic material 32 which is forced out from between and to the sides of weld surfaces 28 and 29 during the welding process.

Materials which have proven useful, as the turnings containment material, are those that absorb and incorporate the turnings while being of a structure that can be completely dislodged from the gap between the weld surfaces. Materials fitting this description include adhesives with a polyamide base, multi-component adhesives, silicon, and natural rubber.

The process, according to the invention is not limited to the shown configurations of the joining points, that is a flange extending the walls of the parts to be joined, nor is it limited only to surface arrangements with horizontal or perpendicular surfaces. It is possible to any friction weld joint when the materials to be joined are a hard polyamide generally having a defined melting point above about 250 degrees Celsius.

I claim:

1. A process for the joining polyamide parts by friction welding, comprising the steps of:
    a. introducing a plastic or elastic material into a groove in a first piece to be joined to a second piece;
    b. placing said first piece in a restraining mount so that said first piece is held stationary;
    c. bringing a second piece, having a tongue portion, into contact with said first piece such that a bottom side of said tongue portion is forced into contact with a bottom surface of said groove forcing said plastic or elastic material into surrounding gaps between ancillary surfaces of said first and second pieces;
    d. imparting movement in said second piece thereby generating heat of friction and producing a frictional weld between said bottom side of said tongue portion and said bottom surface of said groove.

2. A process as claimed in claim 1 wherein particles created during the movement step are captured and contained in said plastic or elastic material forced into said gaps when said second piece is brought into contact with said stationary first piece.

3. A process as claimed in claim 1, wherein said plastic or elastic material is a composition selected from the group consisting of silicon, natural rubber, multi-component adhesives or a molten adhesive based on polyamides.

4. A friction welded joint structure produced by:
    providing a first polyamide piece, said first polyamide piece containing a groove having a bottom weld surface;
    providing a second piece, said second polyamide piece having a tongue portion;
    introducing a plastic or elastic material into said groove between said bottom weld surface and a lower weld surface on said tongue portion;
    bringing said lower weld surface of said tongue portion of said seond polyamide piece into contact with said bottom weld surface of said groove all remaining paired opposing surfaces of said first and second polyamide pieces being spaced apart from each other thereby creating gaps, said elastic or plastic material being forced from between said bottom weld surface of said groove and said lower weld surface tongue portion and into said gaps;
    imparting a rotary or oscillating movement to said second polyamide piece;
    capturing turnings produced by said rotary or oscillating movement in said elastic or plastic material previously displaced into said gaps; and
    bonding said lower weld surface of said tongue portion of said second polyamide piece to said bottom weld surface of said groove of said first polyamide piece by continued rotary or oscillating movement of said second polyamide piece.

5. A friction welded joint structure as claimed in claim 4 wherein at least one pair of opposing surfaces of said first and second polyamide pieces, in addition to said bottom weld surface of said groove and said lower weld surface of said tongue portion, are in contact during said imparting of rotary or oscillating movement thereby producing at least one additional weld, whereby a gap between said paired opposing surfaces of said first and second polyamide pieces occurs on only one side of said tongue portion and said groove.

6. A friction welded joint structure as claimed in claim 4 wherein said gaps remaining following completion of said bonding are sufficient to contain said plastic or elastic material displaced from between said lower weld surface of said tongue portion and said bottom weld surface of said groove.

* * * * *